United States Patent Office 2,865,866
Patented Dec. 23, 1958

2,865,866

SPHEROIDAL ALUMINA

James Hoekstra, Evergreen Park, Ill., assignor to Universal Oil Products Company, Des Plaines, Ill., a corporation of Delaware No Drawing. Application January 6, 1956
Serial No. 557,627

14 Claims. (Cl. 252—448)

This application is a continuation-in-part of my now abandoned copending application Serial No. 304,647, filed August 15, 1952, which in turn is a continuation-in-part of my copending application Serial No. 148,509, filed March 8, 1950, now U. S. Patent No. 2,620,314, issued December 2, 1952.

This invention relates to the manufacture of alumina particles and more particularly to a novel method of manfacturing alumina particles of substantially spherical or spheroidal shape.

The use of alumina particles in substantially spherical or spheroidal shape offers numerous advantages, particularly when the alumina is used as an adsorbent, treating, refining or purifying agent, or as a catalyst or component of a catalyst for the conversion of organic compounds and still more particularly for the conversion of hydrocarbons. When used as a fixed bed of packing material in a reaction or contacting zone, the spheroidal shaped particles permit more uniform packing and thereby reduce variations in the pressure drop through the bed and accordingly reduce channeling which otherwise results in a portion of the bed being by-passed. Another advantage to the use of particles of this shape is that the spheres contain no sharp edges to break or wear off during processing or handling and, therefore, reduce the tendency to plug the process equipment. These advantages are magnified when the alumina particles are used as a moving bed, that is, when the particles are transported from one zone to another by either the reactants or by an extraneous carrying medium. It is thus seen that the use of particles of this shape permits a more effective utilization of the alumina.

Another very important advantage to the manufacture of alumina particles in accordance with the present invention is in the matter of economics. A prior method of obtaining alumina particles of uniform size and shape and of the desired hardness has been by means of a pilling operation. From the description to be hereinafter set forth, it will be readily apparent that the process of the present invention affords a considerably more economical method of manufacturing the alumina particles of substantially uniform size and shape.

Extensive investigations have been conducted on the manufacture of substantially spherical or spheroidal alumina particles by the method of passing droplets of alumina-containing solutions, sols or other mixtures into an immiscible liquid. These investigations have shown that satisfactory alumina particles are not as readily manufactured by this method as are some other inorganic oxide particles as, for example, silica spheres. In order to obtain satisfactory spherical particles of alumina, it is necessary to employ a sol which will set to a gel within a desired time interval. For example, when adding a conventional precipitating reagent, such as ammonium hydroxide, to an aluminum salt, such as aluminum chloride, aluminum nitrate, etc., a gelatinous precipitate sets immediately and, therefore, cannot be formed into the desired spherical shape by this method of operation. It has now been found that satisfactory alumina particles may be manufactured by this method, provided certain features are adhered to.

The alumina spheres to be aged in accordance with the process of my invention may be prepared in any suitable manner. One very satisfactory method of preparing substantially spherical alumina particles comprises preparing an alumina sol by digesting aluminum in aluminum chloride solution, commingling said sol with water to form a mixture containing from about 15% to about 35% by weight of alumina, separately commingling water with hexamethylenetetramine to form a solution containing from about 15% to about 40% by weight of hexamethylenetetramine, and commingling said mixture and said hexamethylenetetramine solution at below gellation temperature and in volume ratios of hexamethylenetetramine solution to said mixture of from about 3:1 to about 1:1.5. The resultant mixture thereafter is passed in droplet form and while still at below gellation temperature into an oil bath maintained at a temperature of from about 120° F. to about 220° F. The droplets are retained in this oil bath until the droplets set to gel spheres.

Another method of preparing alumina spheres is by contacting a large excess of aluminum metal with a 12% hydrochloric acid solution until the desired aluminum content is reached. This aluminum sol containing aluminum and chloride ions is mixed with hexamethylenetetramine. The resultant mixture thereafter is passed in droplet form while still at below gellation temperature into a warm oil bath to set the sol into gel spheres.

The spheres prepared by the above described methods contain a certain amount of chloride ions and in accordance with my invention the number of equivalents of chloride ions in this sphere normally determines the amount of base that will be used in aging the spheres.

Contrary to the experiences found with the other inorganic oxide spheres and particularly silica spheres, the alumina spheres must not be contacted with water at this stage of operation. The alumina spheres are water soluble and, therefore, will be destroyed upon being contacted with water. It, therefore, is an important feature of the present invention that the alumina spheres be aged prior to being contacted with water. Furthermore, this aging must be in the presence of a basic medium and this, as herein set forth, comprises an essential feature of the present invention. In another manner of operation the spheres may be simultaneously contacted with a basic medium and water.

In a broad embodiment the present invention relates to the step in the process of preparing substantially spherical alumina particles which comprises aging alumina spheres in a basic medium containing at least about 1.0 equivalent of the base for each equivalent of chloride in the sol.

In another embodiment the present invention relates to the step in the process of preparing substantially spherical alumina particles from a sol containing aluminum and chloride ions which comprises aging alumina spheres in a basic medium containing at least about 1.0 equivalents of base for each equivalent of chloride in the sol. The use of at least about 1.0 equivalent of base for each equivalent of chloride in the sol has several advantages, one of which is to greatly shorten the time of aging. It has been proposed to age the spheres in a liquid basic medium containing less than about 1.0 equivalent of base for each equivalent of chloride in the sol and in this type of aging it is preferred to age the sphere in oil for at least 4 hours and usually for at least 10 hours and then in the liquid base for at least 10 hours, and the still more preferred time for both of these aging steps is 16 to 24 hours. As set forth in this invention, in one embodiment using at least about 1.0 equivalent of base for each equivalent of chloride in the sol, the time of aging in the base can be about one hour and in some instances, hereinafter further described, the time can be considerably less than one hour. In another mode of operation herein described the spheres are aged in the oil and ammonia simultaneously and the total time of aging may be only from about 10 to about 12 hours and can be as low as 4 hours, but usually at least one hour.

Another advantage of using the aging procedure of this invention is that a much better product is obtained. Spheres aged with at least about 1.0 equivalent or more of base not only show less breakage when dried rapidly, but they are also less susceptible to breakage during subsequent handling and use. In my copending application, Serial No. 148,509, it is mentioned that it is preferred to use mild drying conditions including a humid atmosphere, especially when preparing alumina spheres having a density of from about 0.4 to about 0.6 grams per cc. Using the procedure of my invention it is now possible to obtain better spheres while at the same time being able to dry the spheres rapidly.

In one embodiment of the invention the spheres may be aged at an elevated temperature in the presence of the suspending medium, and at least about 1.0 equivalent of a base for each equivalent of chloride ion present in the sol is introduced into the suspending medium for a period of preferably at least one hour and more preferably of from about 4 to 12 hours or more at an elevated temperature. However, the base may be added even more rapidly, for example, within 10 minutes and satisfactory spheres will be produced. The base is rapidly absorbed by the spheres and the base is added until saturation of the spheres with the basic gas is accomplished which is evidenced by the inability of the spheres and suspending medium to further absorb the base.

While less than 1.0 equivalents of base for each equivalent of chloride ion present in the sol may be used the resulting product will not have comparable quality. It is possible to use less than about 1.0 equivalent of base, however, when this lesser amount is used the resulting spheres are chalky and full of cracks. Likewise an amount of base greater than about 1.0 equivalents may be used in accordance with the procedure of this invention and it is desirable to use as much as about 1.5 equivalents of base to be certain that the spheres are thoroughly saturated with the base. Amounts of base greater than 1.5 equivalents may be used; however, since the spheres would already be saturated with the base the presence of a greater amount is unnecessary.

In accordance with the present invention at least about 1.0 equivalent and preferably from about 1.0 to about 1.5 equivalents of base for each equivalent of chloride in the sol is used for the aging. In one mode of operation at least 1.0 equivalent of base is contacted with the spheres after the spheres are separated from the aging oil and in another mode of operation the base is introduced into the aging oil, thus the spheres are aged at least 1 and preferably 4 hours or more in a non-aqueous medium at a temperature in the range of from about 125° F. to about 220° F. The non-aqueous medium usually is the suspending medium used in the pure form or it may be any other suitable oil such as Nujol or it may be any suitable solvent refined neutral oil. As herein set forth at least 1.0 equivalents of base for each equivalent of chloride ion present in a sol is added during or immediately following this aging in the non-aqueous medium.

In one embodiment the oil is drained from the spheres and the base is introduced directly to the spheres. While a gaseous base or a liquid base may be introduced in as short a time as 10 minutes by this means, it may be extended to 4 hours or more. During this aging period an elevated temperature is used, which temperature preferably is above about 125° F. and generally will not be greater than about 220° F. and preferably of from about 190° F. to about 210° F.

In a preferred embodiment of the invention the spheres are removed from the suspending medium and are aged in an oil of the type used as the suspending medium at an elevated temperature and then the oil is drained from the spheres and the spheres are further aged by contacting them with a base. The preferred temperature is above about 125° F. and generally will not be greater than 220° F. The time of aging in the oil is at least 1 hour and preferably from about 4 to about 10 hours or more. The oil age may be extended to 24 hours in some cases. The base is absorbed by the spheres very rapidly and in the preferred operation from about 1.0 to about 1.5 moles of base are used for each equivalent of chloride in the spheres. This amount may be introduced in as short a time as 10 minutes. However, the quality of the finished product is improved by extending it to at least 1 hour after which time hot water is introduced and the spheres are washed. Considerable temperature variations, during the short time of introducing a gaseous base to the spheres can be tolerated. It is preferred that after the contact with at least 1.0 equivalent of base, that the spheres remain in an aqueous solution for at least 1 hour and preferably at least 4 hours, and the contact with water may be within the range of 6 to 24 hours and can even be extended to greater than 24 hours if desired.

The aging with gaseous or liquid base may be effected in any suitable manner. When using a gaseous base, the gaseous base may be passed either concurrently or countercurrently to the sphere. Excess base not absorbed by the spheres may be withdrawn from the aging zone and reused for the treatment of the same or additional spheres. When using a liquid base, which in a preferred embodiment comprises an aqueous solution of the base, the spheres may be soaked in the base for the desired time. In a batch type operation, the excess base may be drained from the spheres and the excess base may be used as such or renewed with fresh base, as desired, for the aging of the same or additional batch of spheres. Similarly, in a continuous type operation using a liquid base, the base may be passed either concurrently or countercurrently to the spheres and continuously withdrawn from the aging zone. The withdrawn base may be recycled for further treatment of the same or additional batches of spheres and, here again, the base may be renewed with additional base as desired. In any event, the amount of base contacted with the spheres should be at least 1.0 mole equivalents for each equivalent of chloride in the spheres.

In accordance with the present invention, the preparation of satisfactory alumina spheres is effected by aging the spheres in a basic medium prior to contacting them with water or the spheres may be aged in a basic aqueous medium. The use of 1.0 to 1.5 equivalents of base for each equivalent of chloride present in the sol for the aging enables the aging period to be considerably reduced and at the same time producing spheres of superior quality. In former aging operations where less than those amounts were used the aging period in the basic medium preferably was about 10 hours, however, by using at least 1.0 equivalents of base it is possible to decrease the aging time in the basic medium to about 1 hour or less. As hereinbefore set forth, the time of aging may even be 10 minutes or less and the essential time limit in contact with the basic medium is for a sufficient time for the substantially spherical alumina particles to absorb at least 1.0 equivalents of base for each equivalent of chloride ion present in the sol used in preparing the alumina particles.

After contact with at least 1.0 equivalent of the base, it is preferred that the spheres be further aged at least 1 hour and preferably at least 4 hours in an aqueous medium at a temperature in the range of from about 175° F. to about 220° F., and the contact with water may be within the range of 6 to 24 hours and can even be extended to greater than 24 hours if desired. It is preferred to maintain a concentration of at least 0.01% of ammonia or an equivalent amount of another suitable base in the aqueous medium. This aqueous aging step may also be considered a combination aqueous aging-washing step. Since the aging may be done in the aqueous medium while the spheres are being washed with an aqueous solution containing at least 0.01% of a base, the aqueous aging may be continued for 1 hour or more and followed by washing with cold water or the aqueous medium containing the base may be removed in as little as 10 minutes and the aqueous aging step completed by washing with hot water preferably in the temperature range of from about 175° F. to about 220° F. at which a concentration of at least 0.01% of ammonia or an equivalent amount of another suitable base is maintained.

The washing or aqueous aging may be performed in any suitable manner. A particularly satisfactory method is to wash the spheres by percolation with either upward or downward flow of water and preferably with water containing a small amount of the basic medium used and/or a small amount of ammonium hydroxide and/or ammonium nitrate. The washing is preferably effected at an elevated temperature of from about 125° F. to about 220° F. and more preferably of from about 190° F. to about 210° F. After washing the spheres may be dried at a temperature of from about 200° F. to about 600° F. for about 2 to 24 hours or more, or dried at this temperature and then calcined at a temperature of from about 800° F. to about 1400° F. for about 2 to 12 hours or more, and then utilized as such or composited with other catalytic components. When using less than about 1.0 moles of base per equivalent of chloride ion in the sol for the aging, it is preferred that the spheres be dried slowly and that the drying be effected in a humid atmosphere because this has been found to result in less breakage of the spheres. When less than about 1.0 moles of base per equivalent of chloride ion in the sol is used and it is desired to use severer drying conditions in order to speed up the drying operation, it becomes necessary to extend the oil aging time to 100 hours or more to prevent breakage so that nothing is gained. When at least 1.0 moles of base are used, however, the aging time may be greatly shortened and very severe and rigid drying may be used while producing a product of superior qaulity.

As is hereinbefore described it is an essential feature of the present invention that at least 1.0 equivalents of base per equivalent of chloride ion in the sol be used for the aging, and it is to be understood that the base may be introduced as a liquid which becomes gaseous upon heating to the temperature of the suspending medium or oil aging medium or the temperature prevailing in the aging section. Anhydrous ammonia is a particularly preferred base to use in the process. Other suitable bases are methyl amine, diethylamine, dimethylamine, etc., however, it is to be understood that these bases are not necessarily equivalent.

As hereinbefore set forth the alumina spheres may be used as an adsorbent or refining agent to treat organic compounds and also are particularly satisfactory for use as a component in catalysts. These spheres are particularly suitable for use as a component in the recently discovered "Platforming catalyst" which comprises alumina, from about 0.01% to about 1% by weight of platinum and from about 0.1% to about 8% by weight of combined halogen. Another particularly suitable catalyst comprises alumina composited with from about 5 to about 40% by weight of a compound and particularly an oxide of one or more elements in the left-hand columns of groups IV, V, and VI of the periodic table, which catalysts are utilized in the reforming, hydrogenation, dehydrogenation, dehydrocyclization, etc. of hydrocrabons or other organic compounds. Typical catalysts of this type include alumina-chromia, alumina-molybdena, alumina-vanadia, etc.

The Platforming catalyst is utilized for the treatment of a gasoline at a temperature of from about 800° F. to about 1100° F. and at a superatmospheric pressure of from about 100 to about 1000 p. s. i. in the presence of hydrogen. Dehydrogenation reactions are effected at temperatures of from about 800° F. to about 1200° F. and usually at moderate superatmospheric pressure which is below about 50 pounds per square inch. Hydrogenation reactions are effected at lower temperatures and higher pressures which generally range from about 200° F. to about 600° F. and pressures of from about 200 to about 1000 pounds or more per square inch.

The alumina spheres may be used as contacting agents or as treating or refining agents for organic compounds and thus may find utility in effecting dehydration reactions, dehalogenation reactions, desulfurization reactions, etc.

The following examples are introduced to illustrate further the novelty and utility of the present invention, but not with the intention of unduly limiting the same.

*Example I*

120 grams of aluminum metal cuttings were placed in a solution of 241 grams of aluminum chloride hexahydrate in 600 ml. of water and this mixture was heated. This resulted in an aqueous sol containing about 16.0 equivalents of aluminum and 3 equivalents of chloride ion in a volume of 800 ml. A solution of 30% by weight of hexamethylenetetramine in water was mixed in about equal proportions with another portion of the sol. This resulted in a slightly viscous mixture. Droplets of the mixture were dropped into an oil bath at a temperature of about 203° F., and firm hydrogel spheres were formed. The spheres were aged in the suspending medium for 12 hours, after which 1.2 moles of gaseous ammonia per equivalent of chloride ion is added. The ammonia is introduced over a period of 1 hour and the spheres are allowed to remain in contact with the ammonia for an additional 1 hour. The spheres aged in this manner are then washed with water at about 203° F. These spheres will not dissolve in water and will retain their rigidity.

*Example II*

The steps of Example I were repeated, however, in this example the gaseous ammonia is introduced in 10 minutes and allowed to remain in contact with the spheres for an additional 5 minutes. The spheres prepared are very rigid and show excellent physical characteristics.

*Example III*

A continuous process for the manufacture of spherical particles was developed. Several batches of alumina sol (26–28% $Al_2O_3$) were prepared in substantially the same manner set forth in Example I. A hexamethylenetetramine solution was prepared by adding sufficient water to 291 grams of hexamethylenetetramine to form 1 liter of solution. The sol and solution were passed, each at a rate of 12 cc. per minute, into a small mixer having a baffle rotated by means of a motor. Droplets were emitted from the bottom of the mixer into a forming chamber of 2 inch diameter and 5 feet long. The tip of the nozzle from which the mixture was dropped was about 2 mm. in diameter, and the forming chamber was filled with Nujol up to about 1½ inches below the nozzle tip. The forming chamber was maintained at a temperature of 205° F. by means of electrical heating elements surrounding the chamber. The droplets assumed substantially spherical shape during passage through the Nujol and were removed from the lower portion of the forming chamber by means of a stream of Nujol maintained at a temperature of about 205° F. The Nujol stream containing the spheres was passed into another zone in which a level of Nujol was maintained. A basket was submerged beneath the level of Nujol in this second zone and this basket served to collect the spheres and also to prevent the spheres from contacting the atmosphere. The second zone likewise was maintained at a temperature of about 205° F. When approximately 1100 grams of alumina spheres, calculated on a dry basis, were accumulated, the basket was removed from the second zone and the spheres were aged in Nujol at substantially the same temperature for 20 hours.

The partially aged spheres were then further aged by draining the oil and rapidly introducing 1.2 moles of anhydrous ammonia gas for each equivalent of chloride ion present in the sol, to the batch of spheres. The ammonia was introduced in approximately 15 minutes. The spheres were then washed at 205° F. with water containing 0.02% of ammonia. The washing was continued for 24 hours. The washed spheres were then dried in a muffle furnace in a stream of air at 600° F. The resultant alumina spheres prepared in the above manner were well formed, rigid particles and could be exposed to the atmosphere and washed with water without substantial breakage.

*Example IV*

A batch of alumina spheres was prepared according to the procedure outlined in Example III. The spheres were immediately removed from the forming zone and the spheres were aged in Nujol at 205° F. for 10 hours. The oil was then drained from the spheres and 1.5 moles of ammonia gas for each equivalent of chloride ion in the sol was introduced to the spheres over a two hour period while maintaining the temperature in the aging zone at 205° F. The spheres were then washed with water containing 0.02% of ammonia. The washed spheres were then dried in a muffle furnace in a stream of air at 600° F. The alumina spheres prepared in the above manner were well formed, rigid particles and could be exposed to the atmosphere and washed at 205° F. with water without breakage. This example shows that the aging times, both in the oil aging section and basic aging section, may be substantially reduced when gaseous ammonia in an amount of 1.5 moles per equivalent of chloride ion in the sol is used.

*Example V*

A batch of spheres was prepared according to the procedure as outlined in Example III. The spheres were removed from the forming zone and were aged in Nujol at 205° F. for 19 hours. The partially aged spheres were then further aged by draining the oil and rapidly introducing 0.6 mole of anhydrous ammonia per equivalent of chloride ion in the spheres. The spheres were then washed at 205° F. with water containing 0.02% of ammonia. The washing was continued for 24 hours. The washed spheres were then dried in a muffle furnace in a stream of air at 600° F. in which the stream of air was passed at a velocity of 20 feet per second over the spheres. The yield of unbroken alumina spheres was only 50.8%. This example illustrates that the use of only 0.6 mole of ammonia gas per equivalent of chloride ion, for the aging of spheres prepared in this manner, results in low yields of unbroken alumina spheres.

*Example VI*

A batch of alumina spheres was prepared according to the procedure outlined in Example III. The spheres were removed from the forming zone and aged in a solvent refined neutral oil at 203° F. for 23 hours. The partially aged spheres were further aged by draining the aging oil and aging the spheres in a 1.4% aqueous ammonia solution. Enough of this ammonia solution was provided so that 1.3 moles of ammonia were present for each equivalent of chloride present in the sol. This aging continued for 24 hours. The spheres were than washed with a 0.02% ammonia solution for 24 hours at 203° F. The washed spheres were then rapidly dried in a muffle furnace in a stream of air at 600° F., the resultant alumina spheres prepared in the above manner were well formed, rigid particles. After the aging and washing steps the spheres could be rapidly dried under extremely severe conditions without substantialy breaking or injuring the spheres.

*Example VII*

A batch of spheres was prepared by contacting a large excess of aluminum metal with 12% hydrochloric acid solution until the desired aluminum content was reached. The composistion of the sol was 12% aluminum and 10% chloride ion and corresponds to about 15.5 equivalents of aluminum and 3.3 equivalents of chloride ion in 800 mm. or about 23% alumina. The sol was mixed with a solution of hexamethylenetetramine and droplets of the solution were passed into a forming tower 6 inches in diameter and 8 feet long. The forming tower was filled with a solvent refined neutral oil and was maintained at a temperature of 203° F. by means of electrical heating elements surrounding the tower. The droplets assumed substantially spherical shape while passing through the oil and were removed from the lower portion of the forming tower. The spheres were then immediately aged in the same suspending oil for 10 hours at 203° F., followed by an aging in a 1.4% aqueous ammonia solution in which enough of the solution was provided so that 1.3 moles of ammonia per equivalent of chloride ion present in the sol was provided. The spheres were aged in this ammonia solution at 203° F. for 2 hours, after which they were washed with a 0.02% ammonia solution at 203° F. for 12 hours. The spheres were then rapidly dried in a muffle furnace at 650° F. and the resultant spheres were well formed and rigid and suitable as catalysts or catalyst carrier bases.

*Example VIII*

A number of different batches of spheres were prepared in substantially the same manner as described in Example VII but the equivalents of ammonia per equivalent of chloride in the sol were varied. The equivalents of ammonia per equivalent of chloride in the sol ranged from 0.88 to 1.17. The percent of whole spheres recovered after drying of those aged in ammonia in an amount of at least about 1.0 mole equivalents per equivalent of chloride was 90 and over. On the other hand, only 55.9% of whole spheres were recovered from those aged in ammonia in amount of 0.88 mole equivalents per equivalent of chloride ion in the sol.

This example illustrates the necessity of using ammonia in a concentration of at least 1.0 mole equivalents per equivalent of chloride in the spheres, and this feature comprises the important advantage of operating in accordance with the present invention.

*Example IX*

A batch of spheres is prepared according to the method illustrated in Example III. These spheres may be aged by immersing them in Nujol at 205° F. for 20 hours. The partially aged spheres may then further be aged by draining the oil and rapidly introducing dimethylamine gas to the batch of spheres.

*Example X*

A batch of spheres is prepared according to the method illustrated in Example III. These spheres may be aged by immersing them in Nujol at 205° F. for 20 hours. The partially aged spheres may then further be aged by draining the oil and rapidly introducing methyl amine gas to the batch of spheres.

I claim as my invention:

1. In the process of preparing substantially spherical alumina particles from a sol containing aluminum and chloride ions, the step which comprises aging the alumina spheres in a basic medium containing at least 1.0 equivalents of a base selected from the group consisting of ammonia and alkyl amines for each equivalent of chloride in the sol, for a time sufficient to absorb at least 1.0 equivalents of said base.

2. The process of claim 1 further characterized in that said base is ammonia.

3. The process of claim 1 further characterized in that said base is methylamine.

4. The process of claim 1 further characterized in that said base is ethylamine.

5. In the process of preparing substantially spherical alumina particles from a sol containing aluminum and chloride ions, the step which comprises aging the alumina spheres in a basic medium containing at least 1.0 equivalents of a base selected from the group consisting of ammonia and alkyl amines for each equivalent of chloride in the sol, for a time sufficient to absorb at least 1.0 equivalents of said base, and contacting said spheres with water for at least one hour.

6. In the process of preparing substantially spherical alumina particles from a sol containing aluminum and chloride ions, the step which comprises aging the alumina spheres for at least one hour in a basic medium containing at least 1.0 equivalents of a base selected from the group consisting of ammonia and alkyl amines for each equivalent of chloride in the sol.

7. The process of claim 6 further characterized in that said spheres are further aged at least 1 hour in an aqueous medium.

8. The process of treating substantially spherical alumina particles prepared from a sol containing aluminum and chloride ions which comprises aging the alumina spheres for at least one hour in a basic medium containing at least 1.0 equivalent of ammonia for each equivalent of chloride ion in the sol.

9. The process of treating substantially spherical alumina particles prepared from a sol containing aluminum and chloride ions which comprises aging the alumina spheres for at least one hour and at a temperature of from about 120° F. to about 220° F. in oil to which is added at least 1.0 moles of ammonia per equivalent of chloride ion present in the sol.

10. The process of claim 9 further characterized in that the ammonia is added to the oil in gaseous form.

11. The process of treating alumina spheres prepared from a sol containing aluminum and chloride ions which comprises aging said spheres first in oil at a temperature of from about 120° F. to about 220° F. for at least 4 hours and then in a basic medium containing at least 1.0 equivalents of ammonia for each equivalent of chloride ion in the sol.

12. The process of treating alumina spheres prepared from a sol containing aluminum and chloride ions which comprises aging said spheres first in oil at a temperature of from about 120° F. to about 220° F. for at least 4 hours, thereafter draining said oil from the spheres and immediately thereafter aging said spheres in a basic medium containing at least 1.0 equivalents of ammonia for each equivalent of chloride ion in the sol.

13. The process of claim 12 further characterized in that said spheres are further aged at least 1 hour in an aqueous medium.

14. The process of claim 13 further characterized in that said aqueous medium is maintained at a temperature of from about 175° F. to about 220° F.

References Cited in the file of this patent

UNITED STATES PATENTS

| | | |
|---|---|---|
| 2,620,314 | Hoekstra | Dec. 2, 1952 |
| 2,666,749 | Hoekstra | Jan. 19, 1954 |
| 2,689,226 | Hoekstra | Sept. 14, 1954 |
| 2,774,743 | Hoekstra | Dec. 18, 1956 |